United States Patent

(12) United States Patent
Crouzen

(10) Patent No.: US 7,514,918 B2
(45) Date of Patent: Apr. 7, 2009

(54) MONITORING WALL THICKNESS

(75) Inventor: Paulus Carolus Nicolaas Crouzen, Amsterdam (NL)

(73) Assignee: Shell Oil Company, Houston, TX (US)

(*) Notice: Subject to any disclaimer, the term of this patent is extended or adjusted under 35 U.S.C. 154(b) by 778 days.

(21) Appl. No.: 10/739,551

(22) Filed: Dec. 18, 2003

(65) Prior Publication Data
US 2004/0130322 A1    Jul. 8, 2004

(30) Foreign Application Priority Data
Dec. 19, 2002    (EP)    .................................. 02080499

(51) Int. Cl.
G01B 7/06    (2006.01)
G01R 33/12   (2006.01)
G01N 27/72   (2006.01)

(52) U.S. Cl. ........................ 324/229; 324/224; 324/225; 324/239

(58) Field of Classification Search ......... 324/222–243, 324/202; 702/38, 97
See application file for complete search history.

(56) References Cited

U.S. PATENT DOCUMENTS

| 4,757,259 A |   | 7/1988  | Charpentier ............... 324/227 |
| 4,843,319 A | * | 6/1989  | Lara ........................... 324/240 |
| 4,998,208 A | * | 3/1991  | Buhrow et al. .............. 702/35 |
| 5,485,082 A |   | 1/1996  | Wisspeintner et al. ....... 324/202 |
| 6,593,737 B2| * | 7/2003  | Crouzen et al. ............. 324/225 |
| 6,707,296 B2| * | 3/2004  | Looijer ....................... 324/240 |
| 2002/0149359 A1 |   | 10/2002 | Crouzen et al. ............. 324/229 |

FOREIGN PATENT DOCUMENTS

| EP | 0321112 A1 | 6/1989 |
| EP | 0910784 B1 | 5/2002 |
| GB | 1512289    | 6/1978 |
| WO | WO0216863 A1 | 2/2002 |

OTHER PUBLICATIONS

"Application of a signal-reconstruction method to evaluate pulsed eddy-current signals" by H. M. Thomas and G. Wittig, NDT International, vol. 18, No. 5, Oct. 1985, pp. 251-255.

* cited by examiner

Primary Examiner—Reena Aurora
(74) Attorney, Agent, or Firm—William Edward Hickman

(57) ABSTRACT

There is disclosed a method for monitoring wall thickness of an object having an electrically conductive wall, using a pulsed eddy current probe, wherein the same location on the wall is inspected repeatedly over an extended period of time. The pulsed eddy current probe is arranged in a predetermined position relative to the inspection location. The wall thickness $d_m$ is determined from a signal $V_m$ which is recorded as a function of time t and from which a characteristic value $\Phi_m$ is determined, which is used to determined the wall thickness. The measurements are corrected for the influence of temperature. The disclosed method is particularly suitable for determining the rate of corrosion at the inspection location.

30 Claims, 2 Drawing Sheets

MONITORING WALL THICKNESS

The present invention relates to monitoring wall thickness of an object having an electrically conductive wall. The invention relates in particular to such a method based on transient eddy current measurements. The term monitoring is used in the description and in the claims for repeated measuring of wall thickness at a selected inspection location, over an extended period of time. The method allows to detect small changes in wall thickness at the inspection location with sufficient repeatability so as to determine, for example, a corrosion rate of a pipeline wall.

Methods for estimating wall thickness of an electrically conductive object, by means of exciting and measuring the response of transient eddy currents, are known in the art. A probe comprising a transmitter means and a receiver means is placed in proximity with a surface of the object, the near surface. The transmitter is activated, e.g. by energizing and abruptly de-energizing, so as to induce transient eddy currents in the object. Because excitation is frequently done by pulsed operation of the transmitter means, these methods are also referred to as pulsed eddy current (PEC) methods. The eddy currents give rise to a time-varying magnetic field, which generates a signal in the receiver means. Often, the received signal is recorded as a function of time. In one way or the other, in order to estimate wall thickness all these methods evaluate a characteristic value of the signal, which relates to a characteristic time in the signal, and wherein the characteristic time is related to the wall thickness.

PEC methods are suitable for measuring through insulation layers, or through corrosion products. It shall be clear that the term wall thickness in relation to PEC methods is used in the specification and in the claims to refer to the thickness of the metal part of the wall.

European patent application EP 0 321 112 A1 discloses a method of detecting corrosion on walls of container means. The received signal as obtained with this method decays with time. In the initial time portion, shortly after the transmitter is switched off, the signal decays at a relatively slow rate. In the late time portion, the signal decays at a faster rate. The characteristic time at which the transition from slower to faster decay takes place, which is also referred to as the critical time, is a measure of the wall thickness of the object. Therefore, according to the known method an indication of the wall thickness can be obtained by comparing over a period of time the decay of the signal with a reference decay obtained for a known wall thickness, wherein the period of time includes at least a portion beyond the critical time.

European patent application No. EP 0 910 784 A1 discloses another method for determining the wall thickness of an object from a signal representing the decay of eddy currents. The signal as received with this method has generally similar shape as the signal evaluated in EP 0 321 112 A1. However, the wall thickness is now determined from the length of the time interval in which the signal decays from a first magnitude to a second magnitude of the signal, using a predetermined relationship between the length of this time interval and the wall thickness.

The article "Application of a signal-reconstruction method to evaluate pulsed eddy-current signals" by H.-M. Thomas and G. Wittig, NDT International, vol. 18, No. 5, October 1985, pages 251-255 discloses another pulsed eddy current method, for determining residual wall thickness of corroded austenitic container walls. Trains of relatively short transmitter pulses are used in this method, so that both the rising and falling flanks of a pulse give rise to eddy currents. The signals received with this method start at approximately zero amplitude, rise to a maximum, whereafter they cross through zero amplitude towards a negative maximum from where they decay to zero. A wall thickness can be determined from the length of the time interval between the onset of the transmitter pulse and the first zero-crossing point.

The known pulsed eddy current methods are used for wall thickness inspection, wherein the estimated wall thickness is compared with a nominal wall thickness, e.g. of an uncorroded object as produced or of an uncorroded portion of the inspected object. Also, known methods are used to inspect an object at different locations, e.g. along or around the circumference of a pipeline, to identify places where corrosion occurs.

It has, however, so far not been possible to use pulsed eddy current methods for the monitoring of wall thickness, wherein the same location is inspected repeatedly. This is due to the fact that known methods have been found insufficiently precise to allow reliable quantitative comparison of measurements taken at different moments in time, over a period of days, weeks, months or even years. Such long monitoring times are for example necessary, when a rate of corrosion is to be determined. Typical corrosion rates of a carbon steel pipeline can be in the order of one or few millimeters per year, or less. Particular problems with the repeatability of known methods are encountered when the objects to be inspected are from a magnetic material such as carbon steel.

It is therefore an object of the present invention to provide a method for monitoring wall thickness of metal objects which allows more precise measurements so as to allow comparison of results for an inspection location over an extended period of time.

To this end, in accordance with the present invention there is provided a method for monitoring wall thickness of an object having an electrically conductive wall, using a pulsed eddy current probe comprising a transmitter means and a receiver means, which method comprises:

selecting an inspection location on the wall;

at a plurality of inspection times $\theta_m$ (m=2, . . . ,M), arranging the probe in a predetermined position relative to the inspection location, inducing transient eddy currents in the object by activating the transmitter means, recording signals $V_m$ with the receiver means;

determining, for each inspection time $\theta_m$, a temperature $T_m$ indicative of the temperature of the object at the inspection location; and determining, from each of the signals $V_m$, a wall thickness $d_m$ pertaining to inspection time $\theta_m$, wherein the temperature $T_m$ is taken into account.

Applicant has found that an important cause of error in wall thickness measurements is the temperature of the object to be investigated. When two wall thickness measurements of a particular steel wall under otherwise identical conditions are performed by known methods, at different temperatures of the wall, the results can typically deviate by several percent for every 10 degrees of temperature difference. This is an unacceptably large error when small changes due to corrosion are to be detected.

Applicant has also found that and how it is possible to correct measurements for the influence of temperature. Suitably, each signal $V_m$ is recorded as a function of time t and exhibits a characteristic change at a characteristic time $\tau_m$, wherein the step of determining a wall thickness $d_m$ comprises determining from the signal $V_m$ a characteristic value $\Phi_m$ which is a measure of the characteristic time $\tau_m$, and determining the wall thickness $d_m$ from the characteristic value $\Phi_m$, wherein use is made of a first predetermined relationship between the characteristic value and the wall thickness, for the event that the temperature is constant, and a second predetermined relationship between the characteristic value and the temperature, for the event that the wall thickness is constant.

The method of the present invention is particularly suitable for determining a rate of corrosion, which is defined as the average decrease of the metal wall thickness due to corrosion at an inspection location per unit of time.

The invention will now be described by way of example in more detail, with reference to the drawings, wherein FIG. 1 shows schematically an arrangement for performing the method of the invention;

Figure 1:
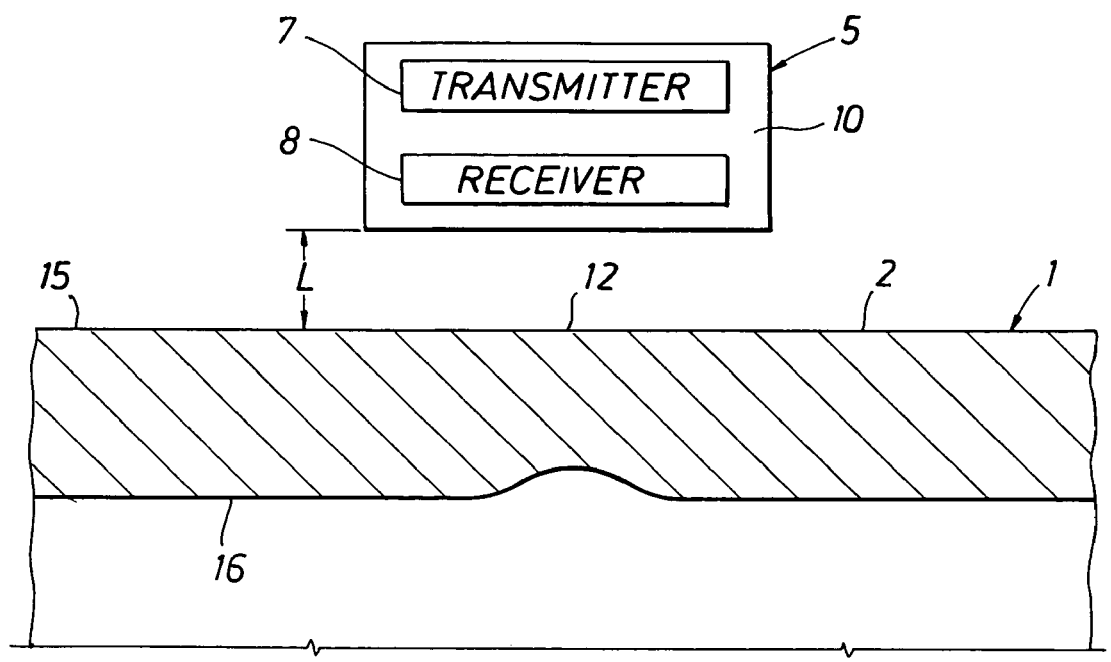

Reference is now made to FIG. 1. FIG. 1 shows an object 1 having an electrically conductive wall 2. A pulsed eddy current probe 5 comprising a transmitter means 7 and a receiver means 8 is arranged in a position 10 above an inspection location 12 on the surface nearest to the probe (the near surface) 15 of the object. The transmitter and receiver means can also comprise one and the same coil. The position 10 is characterised by the lift-off L, and translational as well as rotational orientation parameters in other dimensions (not shown). The thickness between near surface 15 and far surface 16 at the inspection location 12 is to be monitored over time. The object can for example be a pipe, having a radius much larger than its wall thickness. When inspecting pipelines, corrosion often takes place only on the inside of the pipeline. In this case, when the corrosion is to be monitored from the outside of the pipeline, the distance between the probe 5 and near surface 15 remains relatively constant, but the distance between the probe 5 and the far surface 16 underneath inspection location 12 decreases over time (as indicated in the Figure). When corrosion products are formed on the far surface 16 (not shown), they do not contribute to the wall thickness measured by the method.

Figure 2:
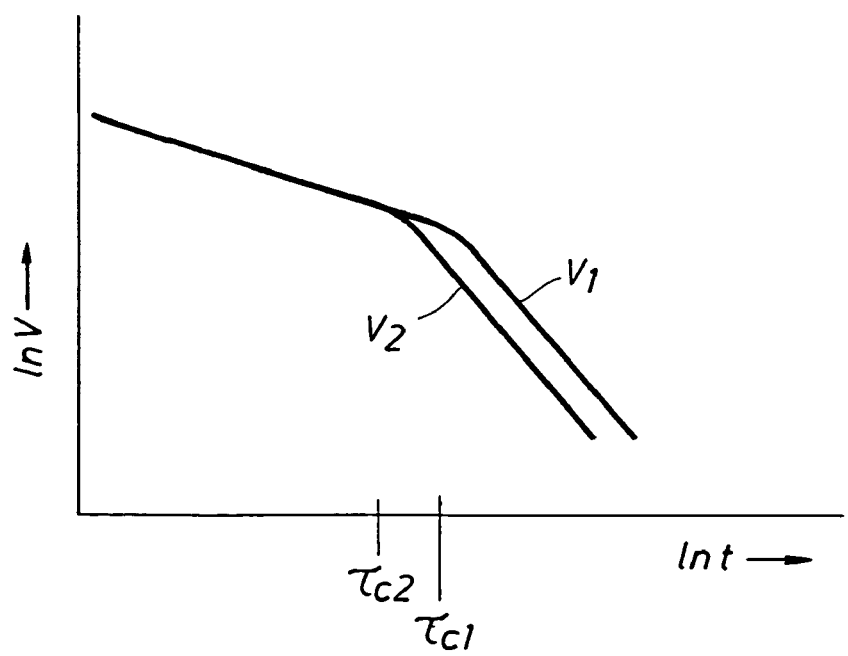
FIG. 2 shows schematically two signals pertaining to different wall thickness values and/or different temperatures of an object, as a function of time, for a typical transient eddy current experiment

Reference is now made to FIG. 2. FIG. 2 shows typical signals $V_m(t)$ as a function of time t, measured at inspection times $\theta_m$ (m=1, 2). Signals of the form as shown, which can for example be voltage or current readings in the receiver means, are obtained in response to transient eddy currents that are generated in the wall by energizing a transmitter coil near a metal object, waiting until any eddy currents due to the energizing have died out, and abruptly de-energizing the transmitter coil. The signals $V_m(t)$ as received in a receiver coil are shown in arbitrary units as a function of the time t after the transmitter has been de-energized, in a double-logarithmic representation. $V_1$ pertains to a larger wall thickness than $V_2$.

Such a signal V(t) can be mathematically described by a function $S(t,\tau_c)$ according to equation (1)

$$V(t) \cong S(t;\tau_c) = \begin{matrix} S_0 t^{-n} & \text{for } t \leq \tau \\ S_0 \tau_c^{-n} e^{n} e^{-n\frac{t}{\tau_c}} & \text{for } t > \tau_c, \end{matrix} \quad (1)$$

wherein
n is a parameter that depends on the curvature of the inspected wall, the type and configuration of the receiver (coil arrangement, Hall sensor), and also of the lift-off which is the distance of the transmitter/receiver arrangement from the near surface of the wall;
$S_0$ is a normalisation factor; and
$\tau_C$ is the so-called critical time.

The critical times $\tau_{c,1}$ and $\tau_{c,2}$ are indicated in FIG. 2. The critical time can be regarded as a measure of the time at which the eddy currents have diffused from the near surface 15 through the wall 2 to reach the far surface 16. The critical time is often described by the following relationship $$\tau_c = \sigma\mu d^2 \quad (2),$$

wherein
σ is the electrical conductivity (units: $\Omega^{-1}m^{-1}$) of the object;
μ is the magnetic permeability of the object (V.s/A.m); and
d is the metal thickness of the object (m).

When σ and μ are constant, the thickness d is directly related to the critical time $\tau_c$. Therefore, by determining the critical time, or more general by determining a characteristic value of the signal that is related to the critical time, information about the wall thickness d van be derived, as it is done in known transient eddy current methods.

However, σ and μ cannot be regarded as constants when the temperature varies. The electrical conductivity of metal conductors is often inversely proportional to the absolute temperature T, $$\sigma(T) \propto \frac{1}{T}.$$

The temperature dependence on the magnetic permeability μ is not straightforward. In magnetic materials, for which the magnetic permeability is very large and also depends on the history of the object, μ tends to increase with temperature.

It shall be clear from the foregoing that the critical time $\tau_c$ is an example of a characteristic time τ in a pulsed eddy current signal, at which a characteristic change occurs, here the transition from a slower to a faster decay rate. The critical time $\tau_c$ itself, or any characteristic value Φ of the signal V(t) which is a function of the critical time, $\Phi = \Phi(\tau_c)$, can be used to determine a wall thickness. Another example for a suitable characteristic value is the integral of the signal V(t) over a period that includes a time after the critical time. A further example is the value of the signal at a time after the critical time, since this value will be the lower, the thicker the wall is. Yet another example is the time it takes for the signal to decay from a first magnitude to a second magnitude, wherein at least the second magnitude is at a time later than the critical time. Equation (2) is a special case of a more general equation $$\Phi(\tau) = F(d,T,P_i) \quad (3),$$

i.e. the characteristic value Φ, which is a function of the characteristic time τ, is a function F of the thickness d, the temperature T, and other parameters $P_i$ of which the lift-off and properties of the probe are examples. Equation (3) can take special forms that represent a first predetermined relationship between the characteristic value and the wall thickness, in the event that the temperature is constant, or a second predetermined relationship between the characteristic value and the temperature, in the event that the wall thickness is constant.

Applicant has found that, when the transient eddy current signal has a shape described by equations 1 and 2, the temperature dependence of the signal is mainly due to the temperature dependence of σ and μ, and that any temperature dependence of other parameters is of second or lower order.

It shall now be explained by way of example how metal wall thickness can be monitored according to the present invention, taking temperature variations between measurements into account.

Let us assume that M signals $V_m(t)$ are measured at inspection times $\theta_1, \ldots, \theta_M$. To this end, the eddy current probe can be fixedly mounted in a particular position above the inspection location. Alternatively, a probe can be placed in a predetermined position before each measurement. The skilled person knows how to repeatedly mount a probe in a certain position, using markers, spacers and the like. A typical lift-off distance is in the order of millimeters, e.g. 10 mm. Suitably, the probe should be repositioned with an accuracy better than about 1 mm vertical (lift-off) and lateral directions, preferably better than about 0.3 mm.

For each inspection time $\theta_m$, a temperature $T_m$ indicative of the temperature of the object at the inspection location 12 is measured. The skilled person knows how to measure a temperature, e.g. using a thermocouple on the wall near the inspection location, or using an infrared thermometer. A sufficient precision of temperature measurements is, needed for an effective temperature correction of PEC measurements. The absolute accuracy is of less importance, since in most cases a correction based on a temperature difference can be applied. It was found, that the repeatability of temperature measurements is suitably better that about 5 K.

Each signal $V_m(t)$ is evaluated so as to determine the critical time $\tau_{c,m}$. An example of how this can be done will be discussed further below.

Signals at time $\theta_1$ and time $\Phi_m$ will now be considered. Suitably, the wall thickness at time 01 is taken as a reference, in particular when a rate of corrosion is to be determined. It shall be clear that the data from any other inspection time can also be used as a reference.

According to equation (2), the wall thickness $d_m$ at time $\theta_m$ is related to the wall thickness $d_1$ at time $\theta_1$ as:

$$d_m = d_1 \frac{\sqrt{(\sigma_1 \mu_1)}}{\sqrt{(\sigma_m \mu_m)}} \frac{\sqrt{\tau_{c,m}}}{\sqrt{\tau_{c,1}}} \quad (4)$$

Two special cases can now be considered.

In the first case, the temperature is kept constant, i.e. $T_m = T_1$. Therefore, $\sigma_1 \mu_1 = \sigma_m \mu_m$, and equation (4) is a relationship between the thickness $d_m$ and the characteristic value $\Phi_m = \tau_{c,m}$. In many cases, the thickness $d_1$ is known in absolute terms, e.g. using an independent absolute measurement technique such as ultrasonic measurements. In this case $d_m$ can also absolutely determined. If $d_1$ is not known in absolute terms, the ratio of $d_m/d_1$ can be determined, i.e. the relative thickness. Alternatively, $d_1$ can be set to an arbitrary value such as 100%. It will be understood, that the term wall thickness is used in the specification and in the claims to refer either to an absolute wall thickness, or to a relative wall thickness with respect to a predetermined reference wall thickness.

In the second special case it is known that the wall thickness between times $\theta_1$ and $\theta_m$ is unchanged, but the temperatures $T_1$ and $T_m$ are different. Therefore, $d_1 = d_m$. Equation 4 is now a relationship between the temperature $T_m$ and the characteristic value $\Phi_m = \tau_{c,m}$ since σ and μ are dependent on temperature and all other parameters are kept constant. This relationship can for example be studied systematically in a calibration experiment. As a result, a calibration curve relating the critical time (more generally: the characteristic value Φ) to the temperature can be obtained.

Applicant has found that calibration experiments can well be described with the following approximation:

$$\left( \frac{\sqrt{(\sigma_1 \mu_1)}}{\sqrt{(\sigma_m \mu_m)}} \right) = 1 + \lambda(T_1 - T_m), \quad (5)$$

wherein λ is a temperature coefficient (units: 1/K, in practice often % per K), which is a calibration constant and typically in the order of (0.03 . . . 0.2)% per K for carbon steel. This approximation works best over temperature intervals of less than 50 K. The unit K (Kelvin) is used for temperature differences, one Kelvin corresponds to a temperature difference of 1 degree centigrade.

Equations (4) and (5) together give $$d_m = d_1(1 + \lambda(T_1 - T_m)) \frac{\sqrt{\tau_{c,m}}}{\sqrt{\tau_{c,1}}}. \quad (6)$$

It is not required to determine the temperature coefficient λ in an independent calibration experiment. λ can also be determined in the course of evaluating the signals $V_m(t)$ (m=2, . . . , M) measured in the course of the wall inspection measurements, for example in the following way. Select a subset of K signals $V_m (K \leq M)$ for which subset it can be assumed that the wall loss due to corrosion is linear in time. For example the subset is formed of data acquired over a period of time that is so short that wall thinning doe to corrosion is small. Thus, for this subset it is assumed that $$d_m = d_1(1 - \psi(\theta_m - \theta_1)) \quad (7),$$

wherein ψ is a (generally unknown) relative corrosion rate in terms of fractional loss of the initial wall thickness per time unit.

The two unknown parameters in equations (6) and (7) can iteratively be determined. For example, a temperature coefficient λ is chosen, and for the entire subset all values $d_m$ are calculated using equation (6). Then, a value for ψ is determined by linear regression of the $d_m$ using equation (7). The temperature coefficient λ is then varied until the linear regression using equation (7) is optimal. This is equivalent to minimizing the following expression $$\sum_{subset}^{K} \left( \lambda(T_1 - T_m) \frac{\sqrt{\tau_{c,m}}}{\sqrt{\tau_{c,1}}} + \psi(\theta_m - \theta_1) \right)^2 = \min. \quad (8)$$

This way to determine λ is also referred to as a bootstrap method.

Equation (6) is a special form of equation (4). By determining the wall thickness $d_m$ as explained with reference to equation (4) or (6), use is made of a first predetermined relationship between the characteristic value and the wall thickness, for the event that the temperature is constant (in this case equation (4) or (6) for the first special case above), and a second predetermined relationship between the characteristic value and the temperature, for the event that the wall thickness is constant (equation (4) or (6) for the second special case above). Equation (6) demonstrates that it has been found that in determining wall thickness from the signal $V_m$ a temperature corrected of wall thickness $d_m$ can suitably be determined by taking the temperature difference with a reference temperature (($T_m-T_1$), or more general ($T_m-T_{ref}$)) into account. Preferably the same reference temperature is used for evaluating all signals $V_m$.

It shall be clear, however, that the first predetermined relationship can have other forms, in particular when another characteristic time, or another characteristic value is used for extracting quantitative wall thickness information from the signal, for example as in EP 321 112 or EP 0 910 784. The first predetermined relationship does not need to have an analytical form, and can also be e.g. an empirical relationship such as a calibration graph relating the signal to a wall thickness.

Also, the second predetermined relationship can have another form. For example a calibration graph can be used instead of a relationship as equation (5), relating the temperature (suitably a temperature difference) to the signal shape, the characteristic value, or a wall thickness correction.

It shall also be clear that it does not matter for the method of the present invention, in which sequence the calculation of wall thickness and the temperature correction are performed. For example, it is possible to first correct the respective signal or the characteristic value derived from the signal for the temperature, followed by determining the wall thickness. Alternatively, first an uncorrected wall thickness can be determined from the characteristic value, followed by a temperature correction using a relationship between the uncorrected wall thickness, the corrected wall thickness and the temperature. Another option is to perform temperature correction and wall thickness calculation at the same time, and a straightforward example of how this can be done is represented by equation (6). In all these cases, use is made of a first predetermined relationship between the characteristic value and the wall thickness, for the event that the temperature is constant, and a second predetermined relationship between the characteristic value and the temperature, for the event that the wall thickness is constant.

EXAMPLE

As an example, an application of the method of the present invention will be discussed, wherein metal thickness loss due to corrosion was monitored at a carbon steel outlet pipe of an air cooler, at a hydrocracking installation. The need for precise corrosion monitoring in this particular example relates to excessive corrosion rates as high as 3 mm per year, which had occurred due to wrong operation of the installation. A maximum further decrease of the metal wall thickness by 1.5 mm was allowed before safety considerations would require shut down of the installation. Had the adverse conditions prevailed, the installation would have to be shut down in less than 6 months.

The operation conditions were restored to normal again, but it was considered necessary to monitor corrosion rates very close. The objective of the corrosion monitoring was in this case to ensure safe operation of the plant by accurately measuring the corrosion rate, so that the remaining time during which the installation can be operated safely can be determined. Furthermore, the measurement of the corrosion rate can be used to steer the operation conditions. Also, the measurement of the corrosion rate provides and early warning in case the excessive corrosion rates should re-occur.

Accordingly, 6 measurement series were conducted over a period of 78 days. During each measurement series, transient eddy current signals were acquired for each of 9 inspection locations that had been selected on the pipe. To this end, a positioning frame was fixedly mounted above each inspection location, co-operating with a PEC probe so that the PEC probe could be repositioned within narrow tolerances above the inspection location.

The positioning frame also included a ceramic temperature shield of 9 mm thickness, to minimize warming of the PEC probe by the heat of the pipe, which might have an influence on the signal. A particular advantage of PEC measurements is it that measurements can be performed through an insulation layer. Some warming of the probe still occurred, it was found however that this merely had an influence on the overall magnitude of the signal, but not a significant influence on the critical time.

The PEC probe comprised a transmitter coil and a receiver coil. Signals were measured after energizing the transmitter coil with the aid of a constant current, abruptly discontinuing the supply of current and sensing the voltage induced in the sensing coil as a function of time t, up to 290 ms after the discontinuation of the supply current. The signals were amplified and digitised by an analogue-to-digital converter, which samples the voltage at N regular time intervals the length $\Delta t_{ADC}$, typically 60 μs.

For each of the inspection locations and inspection times a temperature of the pipe was measured using an infrared thermometer.

The measured signals had an overall shape as shown in FIG. 2. The processing and evaluation of the 6 signals $V_m(t)$ (m=1, ..., 6) measured for a particular one of the inspection locations will now be discussed.

For each signal the critical time $\tau_{c,m}$ was determined in the following way. After the analogue to digital converter, each signal $V_m$ consists of an array of numbers $V_m(q.\alpha t_{ADC})$ (q=1, ..., Q), which can be processed in the memory of a computer.

Due to the use of the positioning frame, the lift-offs $L_m$ of the probe from the near surface of the pipe at each inspection time $\theta_m$ varied very little, $L1 \cong L2 \cong \ldots \cong L6$.

The wall thickness at the beginning of inspection, at time $\theta_1$, was measured using pulse-echo ultrasonic measurements to be $d_1=12.8$ mm.

A reference signal $V_{REF}$ was calculated as the average of signals $V_1$, $V_2$, and $V_3$, $$V_{REF}(q\Delta t_{ADC}) = \frac{1}{3}\sum_{m=1}^{3} V_m(q\Delta t_{ADC}). \tag{9}$$

When the differences between the signals used for averaging are not too large, as in this case, the reference signal represents the overall shape of the signals. The reference signal was fitted to equation (1). The parameters $S_{0,REF}$, n and $\tau_{C,REF}$ were determined by minimizing $$\chi_0^2 = \sum_{q=Q_1}^{Q_2} (V_{REF}(q\Delta t_{ADC}) - S(t; \tau_{c,REF}))^2, \tag{10}$$

using for $S(t;\tau_{c,REF})$ the expression given in equation (1), and wherein $Q_1=t_1/\Delta t_{ADC}$ and $Q_2=t_2/\Delta t_{ADC}$, rounded to the nearest integer, with $t_1=3$ ms (smaller than the critical time of the signals) and $t_2=100$ ms (larger than the critical time of the signals).

In order to determine the critical times $\tau_{c,m}$ of the signals $V_m$, it is assumed that the following relationship holds $$V_m(t) = S_m V_{REF}(t) \frac{S(t; \tau_{c,m})}{S(t; \tau_{c,REF})}. \tag{11}$$

This equation includes a factor $S_m$ which is expected to be unity in case all lift-offs $L_m$ are the same, but which allows to compensate for small deviations in lift-off, or for deviations in the gain of an amplifier in the receiver, e.g. due to changes in probe temperature.

Then, $\tau_{c,m}$ and $S_m$ can be determined by minimizing for each signal $V_m$ $$\chi_m^2 = \sum_{q=Q_3}^{Q_4} \left( V_m(q\Delta t_{ADC}) - S_m \frac{S(q\Delta t_{ADC}; \tau_{c,m})}{S(q\Delta t_{ADC}; \tau_{c,REF})} V_{REF}(q\Delta t_{ADC}) \right)^2$$

wherein $Q_3=t_3/\Delta t_{ADC}$ and $Q_4=t_4/\Delta t_{ADC}$, rounded to the nearest integer, with $t_3=0.2*\tau_{c,REF}$ and $t4=4*\tau_{c,REF}$.

The 6 critical times $\tau_{c,m}$ are used directly as characteristic values $\Phi_m$ of the signals $V_m$. From the $\tau_{c,m}$ the wall thickness values $d_m$ pertaining to inspection times $\theta_m$ and corrected for the influence of temperature are, determined, in the way as had been explained with reference to equations (4)-(8), wherein use is made of the bootstrap method to determine $\lambda$. In this case, data from all 6 inspection times were used in the bootstrap method. The results of the temperature corrected wall thickness data are shown in Table 1. For comparison, the last column of Table 1 shows the wall thickness values, which would be determined without applying the temperature correction according to the present invention. This is equivalent to setting $\lambda=0$ in equation (6).

TABLE 1

| number m | $\theta_m$ (Day) | $T_m$ (° C.) | $d_m$ (mm) ($\lambda = 0.1062\%/K$) | $d_m$ (mm) ($\lambda = 0$) |
| --- | --- | --- | --- | --- |
| 1 | 1 | 61.0 | 12.8000 | 12.8000 |
| 2 | 16 | 62.0 | 12.7920 | 12.7780 |
| 3 | 29 | 65.5 | 12.7216 | 12.6587 |
| 4 | 43 | 57.5 | 12.6894 | 12.7383 |
| 5 | 57 | 48.0 | 12.6368 | 12.8185 |
| 6 | 78 | 54.0 | 12.5933 | 12.6911 |

Figure 3:
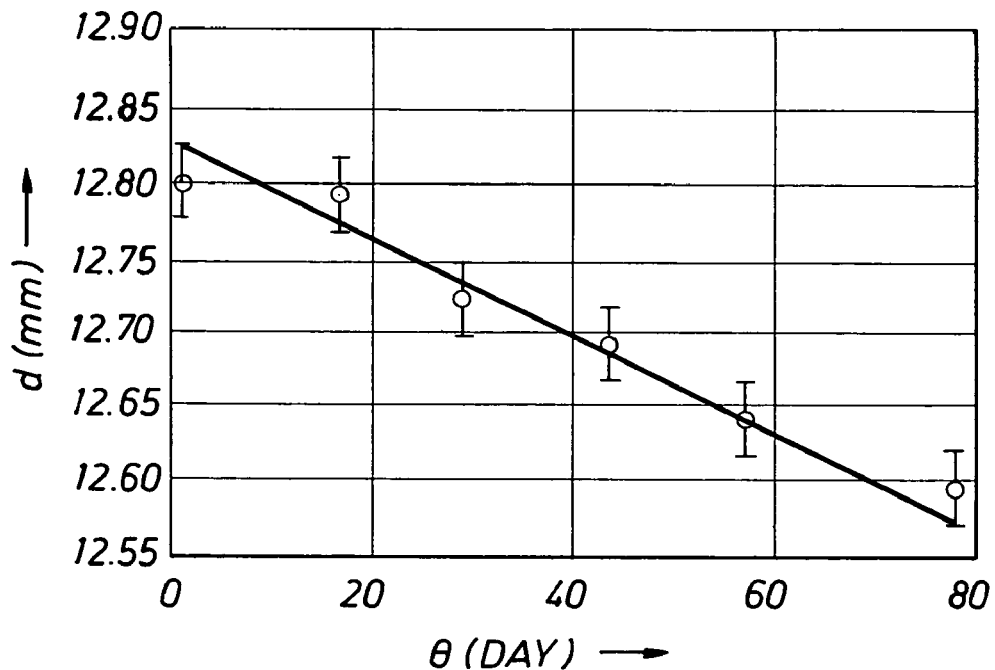
FIG. 3 shows the results of a corrosion monitoring experiment according to the present invention.
Figure 4:
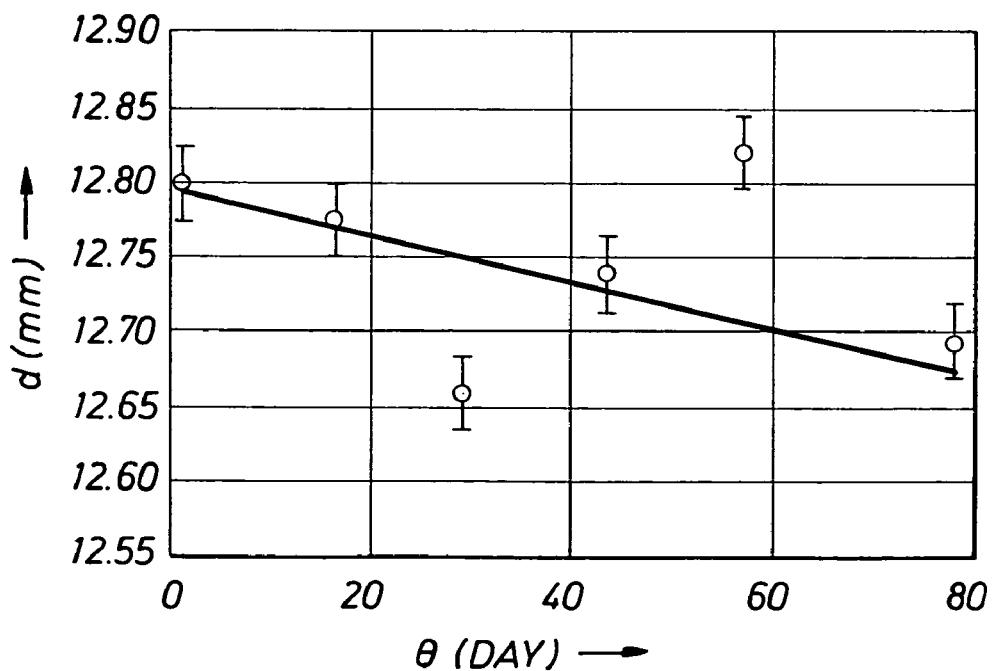
FIG. 4 shows the results of the corrosion monitoring experiment of FIG. 3 which would be obtained if no temperature correction according to the present invention was performed.

FIGS. 3 and 4 illustrate the corrected and uncorrected wall-thickness data, respectively, as a function of inspection time. The error bars that are indicated are estimated based on experience, taking the results of the regression analysis and experience with repeat measurements into account. The error bars do, however, not take explicit account of temperature effects. For the corrected data, the data points are within the error bars consistent with a linear decrease of wall thickness with time. By linear regression a corrosion rate of 1.1 mm per year is obtained. This implies that the remnant service time of the pipe at the inspection location is approximately 1.5 mm/1.1 (mm/year), i.e. ca 1.4 years. Further, the wall thickness data indicate no periods with excessive corrosion rates.

Clearly, if the uncorrected wall thickness values of FIG. 4 would be used for the assessment, different conclusions would be drawn. There appears to be an increase in the wall thickness between the third and fifth inspection time, which is not plausible and undermines the credibility of the data. On the other hand, an excessive corrosion rate between the second and third inspection time is suggested. If a corrosion rate is determined from the data by linear regression, a value of 0.26 mm/year is obtained, which would be equivalent to an estimated remnant service time of 5.8 years. Therefore, using wall thickness data without temperature correction for monitoring of corrosion can lead to an underestimation of the corrosion rate, and hence to unsafe operation conditions.

The size of the temperature correction depends on the degree by which the installations vary in temperature. Even at stable operation conditions, the temperature of parts of an installation can easily vary by 20 to 30° C. due to environmental influences. In other cases, a change in process conditions can cause a temperature change by as much as 250° C. Applicant has found that a typical value of the temperature coefficient $\lambda$ is 0.11% per K. The expected range of fluctuations in the PEC wall thickness readings, if no temperature correction according to the present invention is applied, is therefore typically in the order of $\sigma_T=3\%$ of the wall thickness in case of stable operation conditions and up to $\sigma_T=30\%$ when process conditions change. $\sigma_T$ is also referred to as the repeatability of PEC wall thickness measurements due to temperature changes. Applicant has found that temperature fluctuations in this order of magnitude account for most of the overall repeatability of PEC wall thickness measurements. Repeatability can be defined as the standard deviation of measurements taken by the same operator on the same object using the same equipment, at different points in time.

The design lifetime of a process installation in a refinery or a chemical plant is usually 20 years. The materials are usually selected for suitable corrosion resistance under the operation conditions. The maximum allowance for wall loss over the design life will usually not exceed 50% of the initial wall thickness, so that the maximum corrosion rate will be $$\frac{50\%}{20 \text{ years}} = 2.5\% \text{ per year.}$$

When a corrosion monitoring method is to be applied, the measurement repeatability of the method determines the response time, i.e. the time that it takes for the corrosion monitoring method to detect significant wall loss. For example, wall loss between two measurements is considered significant when it exceeds $\sqrt{2}\sigma_{tot}$, wherein $\sigma_{tot}$ is the total repeatability of the wall thickness measurement and the factor $\sqrt{2}$ reflects the fact that the loss is the difference of two measurements. The response time is therefore in the order of $$\frac{\sqrt{2}\,\sigma_{tot}}{2.5\%} \text{ years.}$$

Even at installations with stable operation conditions, a response time of 1.7 years is calculated using the $\sigma_{tot}=\sigma_T=3\%$ for measurements without temperature correction. A method with such a long response time is not suitable for most applications. Clearly, for systems where process conditions also will vary such that $\sigma_{tot}=\sigma_T\approx30\%$, unrealistically long response times result, exceeding 17 years.

Applicant has found that a repeatability of at least $\sigma_{tot}=1\%$ is required for a practically useful wall thickness monitoring method. Using the method of the present invention, repeatability figures of $\sigma_{tot}\approx 0.5\%$, and even as low as $\sigma_{tot}\approx 0.2\%$ have been obtained, wherein temperature varied by at least 20 K.

In order to determine a corrosion rate, wall thickness is suitably monitored over an extended period of time. An extended period of time is suitably at least two weeks, preferably at least one month, more preferably at least 2 months. Preferably the wall thickness is monitored at at least 3, more preferably at least 5 inspection times.

The invention claimed is:

1. A method for monitoring wall thickness of an object having an electrically conductive wall, using a pulsed eddy current probe comprising a transmitter means and a receiver means, by inspecting the same location on the wall repeatedly over an extended period of time, which method comprises:

selecting an inspection location on the wall;

at a plurality of inspection times $\theta_m$ (m=2, ..., M), arranging the probe in a predetermined position relative to the selected inspection location, inducing transient eddy currents in the object by activating the transmitter means, recording signals $V_m$ with the receiver means;

determining, for each inspection time $\theta_m$, a temperature $T_m$ indicative of the temperature of the object at the inspection location; and determining, from each of the signals $V_m$, a wall thickness $d_m$ pertaining to inspection time $\theta_m$, wherein the temperature $T_m$ is taken into accounts;

wherein each signal $V_m$ is recorded as a function of time t and exhibits a characteristic change at a characteristic time $\tau_m$, wherein the step of determining a wall thickness $d_m$ comprises determining from the signal $V_m$ a characteristic value $\Phi_m$ which is a measure of the characteristic time $\tau_m$, and determining the wall thickness $d_m$ from the characteristic value $\Phi_m$, wherein use is made of a first predetermined relationship between the characteristic value and the wall thickness, for the event that the temperature is constant, and a second predetermined relationship between the characteristic value and the temperature, for the event that the wall thickness is constant.

2. The method according to claim 1, wherein the method further comprises estimating from the wall thickness values $d_m$ a rate of wall thickness change per time unit.

3. The method according to claim 2, wherein the absolute wall thickness is monitored.

4. The method according to claim 2, wherein a reference wall thickness is selected, and wherein the relative wall thickness with respect to the reference wall thickness is monitored.

5. The method according to claim 2, wherein the inspection times $\theta_m$ span a period of at least two weeks, to at least one month.

6. The method according to claim 2, wherein the wall thickness is monitored at least 3 inspection times $\theta_m$.

7. The method according to claim 2, wherein the temperature of the object at the inspection location is taken into account by placing, before activating the transmitter means, an electrically conductive reference object having a reference thickness between the probe and the inspection object, and in thermal contact with the inspection object, so that each signal $V_m$ has a component pertaining to the eddy currents in the reference object and a component pertaining to the eddy currents in the monitored object; and wherein the influence of temperature on the signals $V_m$ is taken into account by using the signal component pertaining to the eddy currents in the reference object.

8. The method according to claim 2, wherein the wall thickness change is due to corrosion, and wherein a rate of corrosion is determined.

9. The method according to claim 8, wherein a reference wall thickness is selected, and wherein the relative wall thickness with respect to the reference wall thickness is monitored.

10. The method according to claim 8, wherein the inspection times $\theta_m$ span a period of at least two weeks, to at least one month.

11. The method according to claim 8, wherein the wall thickness is monitored at least 3 inspection times $\theta_m$.

12. The method according to claim 8, wherein the temperature of the object at the inspection location is taken into account by placing, before activating the transmitter means, an electrically conductive reference object having a reference thickness between the probe and the inspection object, and in thermal contact with the inspection object, so that each signal $V_m$ has a component pertaining to the eddy currents in the reference object and a component pertaining to the eddy currents in the monitored object; and wherein the influence of temperature on the signals $V_m$ is taken into account by using the signal component pertaining to the eddy currents in the reference object.

13. The method according to claim 8, wherein the absolute wall thickness is monitored.

14. The method according to claim 13, wherein the inspection times $\theta_m$ span a period of at least two weeks, to at least one month.

15. The method according to claim 13, wherein the wall thickness is monitored at least 3 inspection times $\theta_m$.

16. The method according to claim 13, wherein the temperature of the object at the inspection location is taken into account by placing, before activating the transmitter means, an electrically conductive reference object having a reference thickness between the probe and the inspection object, and in thermal contact with the inspection object, so that each signal $V_m$ has a component pertaining to the eddy currents in the reference object and a component pertaining to the eddy currents in the monitored object; and wherein the influence of temperature on the signals $V_m$ is taken into account by using the signal component pertaining to the eddy currents in the reference object.

17. The method according to claim 13, wherein a reference wall thickness is selected, and wherein the relative wall thickness with respect to the reference wall thickness is monitored.

18. The method according to claim 17, wherein the wall thickness is monitored at least 3 inspection times $\theta_m$.

19. The method according to claim 17, wherein the temperature of the object at the inspection location is taken into account by placing, before activating the transmitter means, an electrically conductive reference object having a reference thickness between the probe and the inspection object, and in thermal contact with the inspection object, so that each signal $V_m$ has a component pertaining to the eddy currents in the reference object and a component pertaining to the eddy currents in the monitored object; and wherein the influence of temperature on the signals $V_m$ is taken into account by using the signal component pertaining to the eddy currents in the reference object.

20. The method according to claim 17, wherein the inspection times $\theta_m$ span a period of at least two weeks, to at least one month.

21. The method according to claim 20, wherein the wall thickness is monitored at least 3 inspection times $\theta_m$.

22. The method according to claim 21, wherein the temperature of the object at the inspection location is taken into account by placing, before activating the transmitter means, an electrically conductive reference object having a reference thickness between the probe and the inspection object, and in thermal contact with the inspection object, so that each signal $V_m$ has a component pertaining to the eddy currents in the reference object and a component pertaining to the eddy currents in the monitored object; and wherein the influence of temperature on the signals $V_m$ is taken into account by using the signal component pertaining to the eddy currents in the reference object.

23. The method according to claim 20, wherein the temperature of the object at the inspection location is taken into account by placing, before activating the transmitter means, an electrically conductive reference object having a reference thickness between the probe and the inspection object, and in thermal contact with the inspection object, so that each signal $V_m$ has a component pertaining to the eddy currents in the reference object and a component pertaining to the eddy currents in the monitored object; and wherein the influence of temperature on the signals $V_m$ is taken into account by using the signal component pertaining to the eddy currents in the reference object.

24. The method according to claim 1, wherein the method further comprises estimating from the wall thickness values $d_m$ a rate of wall thickness change per time unit.

25. The method according to claim 1, wherein the wall thickness change is due to corrosion, and wherein a rate of corrosion is determined.

26. The method according to claim 1, wherein the absolute wall thickness is monitored.

27. The method according to claim 1, wherein a reference wall thickness is selected, and wherein the relative wall thickness with respect to the reference wall thickness is monitored.

28. The method according to claim 1, wherein the inspection times $\theta_m$ span a period of at least two weeks, to at least one month.

29. The method according to claim 1, wherein the wall thickness is monitored at least 3 inspection times $\theta_m$.

30. The method according to claim 1, wherein the temperature of the object at the inspection location is taken into account by placing, before activating the transmitter means, an electrically conductive reference object having a reference thickness between the probe and the inspection object, and in thermal contact with the inspection object, so that each signal $V_m$ has a component pertaining to the eddy currents in the reference object and a component pertaining to the eddy currents in the monitored object; and wherein the influence of temperature on the signals $V_m$ is taken into account by using the signal component pertaining to the eddy currents in the reference object.

\* \* \* \* \*